United States Patent [19]

Vind

[11] Patent Number: 4,756,257
[45] Date of Patent: Jul. 12, 1988

[54] POWER PLANT WITH CENTRIFUGAL TYPE CLEANERS FOR COMBUSTION GASES

[75] Inventor: Tyge Vind, Finspong, Sweden

[73] Assignee: Asea Stal Aktiebolag, Finspong, Sweden

[21] Appl. No.: 16,707

[22] Filed: Feb. 20, 1987

[30] Foreign Application Priority Data

Feb. 21, 1986 [SE] Sweden ............................ 8600798

[51] Int. Cl.⁴ .................................................. F23J 3/00
[52] U.S. Cl. ..................................... 110/216; 55/343; 110/245; 122/4 D
[58] Field of Search ................ 122/4 D; 60/39.5; 110/216, 245; 55/343

[56] References Cited

U.S. PATENT DOCUMENTS

| | | | |
|---|---|---|---|
| 2,188,206 | 1/1940 | Pfeffer et al. | 55/343 |
| 3,137,133 | 6/1964 | Wilson. | |
| 4,584,949 | 4/1986 | Brannstrom | 122/4 D |
| 4,590,868 | 5/1986 | Isihara | 60/39.5 |
| 4,599,952 | 7/1986 | Meier | 110/216 |
| 4,600,414 | 7/1986 | Metcalfe et al. | 110/216 X |
| 4,669,395 | 6/1987 | Brannstrom | 110/216 |

FOREIGN PATENT DOCUMENTS 2918765  11/1980  Fed. Rep. of Germany.

Primary Examiner—Edward G. Favors
Attorney, Agent, or Firm—Pollock, Vande Sande & Priddy

[57] ABSTRACT

A power plant with combustion of a fuel in a fluidized bed is enclosed within a bed vessel. It includes one or more cleaners for separating dust from the combustion gases leaving the bed. The gas cleaner is built up as a panel or unit with a number of parallel-connected centrifugal cleaners, with a first cylindrical inlet part with guide vanes which impart a rotating movement to the gas flowing through, and a second cylindrical part sliding into the first part and together with this forming an annular gap with an outlet which communicates with a common space and/or with a separator arranged in series with the parallel separators. The panel or unit is directly connected to an outlet opening from the bed vessel and forms part of a bed vessel wall.

6 Claims, 4 Drawing Sheets

1

POWER PLANT WITH CENTRIFUGAL TYPE CLEANERS FOR COMBUSTION GASES

TECHNICAL FIELD

The invention relates to a power plant with cleaners for removing solid particles from combustion gases from a combustion chamber. It is particularly intended for cleaning gases which leave a bed vessel in a plant with combustion in a fluidized bed, in particular a bed in which the combustion takes place at a pressure considerably exceeding the atmospheric pressure. Such a plant, also called a PFBC plant ("PFBC" being the initial letters of Pressurized Fluidized Bed Combustion), is capable of operating at a pressure of up to about 2 MPa (20 bar) and delivering propellent gas to a gas turbine. The separation of solid material from the combustion gases has to be made, for one thing, in view of the environment and, for another, in view of the erosion in the gas turbine. In a PFBC plant, in which the combustion gases are used for driving a gas turbine, the separation has to be made at a high temperature, which involves particular problems.

TECHNICAL PROBLEM AND BACKGROUND ART

When cleaning combustion gases in a PFBC plant the main objectives are:

1. A sufficiently good cleaning in view of the gas turbine and the surrounding environment.
2. A small pressure vessel surrounding the combustion chamber owing to the pressure and as a result of this a small volume of the cleaning plant in the space between the combustion chamber and the pressure vessel.
3. As small a pressure drop as possible for a high gas turbine effect.
4. As small a loss flow as possible for ash conveyance etc.
5. The lowest possible cost.
6. A sufficient life of the plant in spite of the fact that the cleaning plant is subjected to high thermal stresses because of high temperature of the gas which is to be cleaned.

Because of the large volume, the high cost and the insufficient life, cleaning plants with filters are not used in PFBC plants.

Up to now, cleaning plants of cyclone type have been used in PFBC plants.

The positive properties are:
The separation is sufficiently good for propellent gas to the turbine
There is no loss flow
The cost is moderate
A long life is obtained.
A negative property is:
A high pressure drop.

The problem comprises providing, for a PFBC plant, a cleaning plant which is superior to a cyclone type cleaning.

DISCLOSURE OF THE INVENTION

According to the invention, there are employed centrifugal separators having a straight flow pipe with guide valves at the inlet which impart a rotary movement to the gas flowing through. Each separator comprises a first cylindrical part and a second cylindrical part extending into the first part and forming a gap together with the first part. Through this gap the dust-laden flow nearest to the cylindrical wall is tapped and carried off. The main flow of clean gas is led to a turbine. A number of parallel-connected centrifugal separators are built together into a panel which is connected to openings in a bed vessel wall.

A sufficiently good separation for the gas turbine as well as the environment is obtained. The volume is small. The direct connection of a panel unit to a bed vessel wall entails a very insignificant volume requirement, which makes it possible to reduce the volume of a pressure vessel surrounding the bed vessel and the cleaner. The pressure drop is small. The cost is low. Centrifugal cleaners can be manufactured of a heat-resisting material giving a satisfactory life.

The disadvantage of the above type of dust separators, namely the approximately 10 percent loss flow in each stage in the case of a satisfactory degree of separation, can be substantially eliminated by bringing together the loss flows from a group of centrifugal separators and allowing them to pass through a centrifugal separator connected in series with the first-mentioned group. In the latter separator the dust in the loss flow is separated. The cleaned gas from the latter separator is brought together with the main flow of gas from the other centrifugal separators. With a loss flow of 10 percent in both the parallel-connected group and in the subsequent centrifugal separator for the loss flow from the group, the final loss flow will be 10 percent of 10 percent, that is, only 1 percent. To bring about the necessary flow in the series-connected centrifugal cleaner for the loss flow, the main flow has to be throttled somewhat, but in spite of this a low total pressure drop can be obtained.

For rational reasons it may be suitable to construct a cleaning group in such a way that all centrifugal cleaners may have an identical design. If the loss flow is 10 percent, a cleaning group may consist of 10 parallel-connected units and one unit for the loss flow in series with these units or 10 times x parallel-connected units and x units connected in series with these.

Several centrifugal separators may be connected in series for both the main flow and the loss flow.

As previously mentioned, in a power plant according to the invention, the necessary volume for the cleaning plant is small, only a few percent of the volume needed for a cleaning plant with cyclones. In this way, the size of a surrounding pressure vessel can be reduced and hence the cost of the plant be reduced.

The pressure drop is only about 1 percent of the pressure drop in a cleaning plant with cyclones.

The loss flow of combustion plant is acceptable and of just the right magnitude for carrying off solid dust.

Because the cleaning plant is compact and is directly connected to the wall of the bed vessel, the heat losses are smaller than in a cleaning plant with cyclones.

The very short through-flow time for gases, about 10 ms, reduces the problems with chemical reactions between the gas and the material in the cleaners.

BRIEF DESCRIPTION OF THE DRAWINGS

The invention will be described in greater detail with reference to the accompanying drawings, wherein FIG. 1 schematically shows a PFBC power plant to which the invention is applied.

DESCRIPTION OF THE PREFERRED EMBODIMENT

Figure 1:
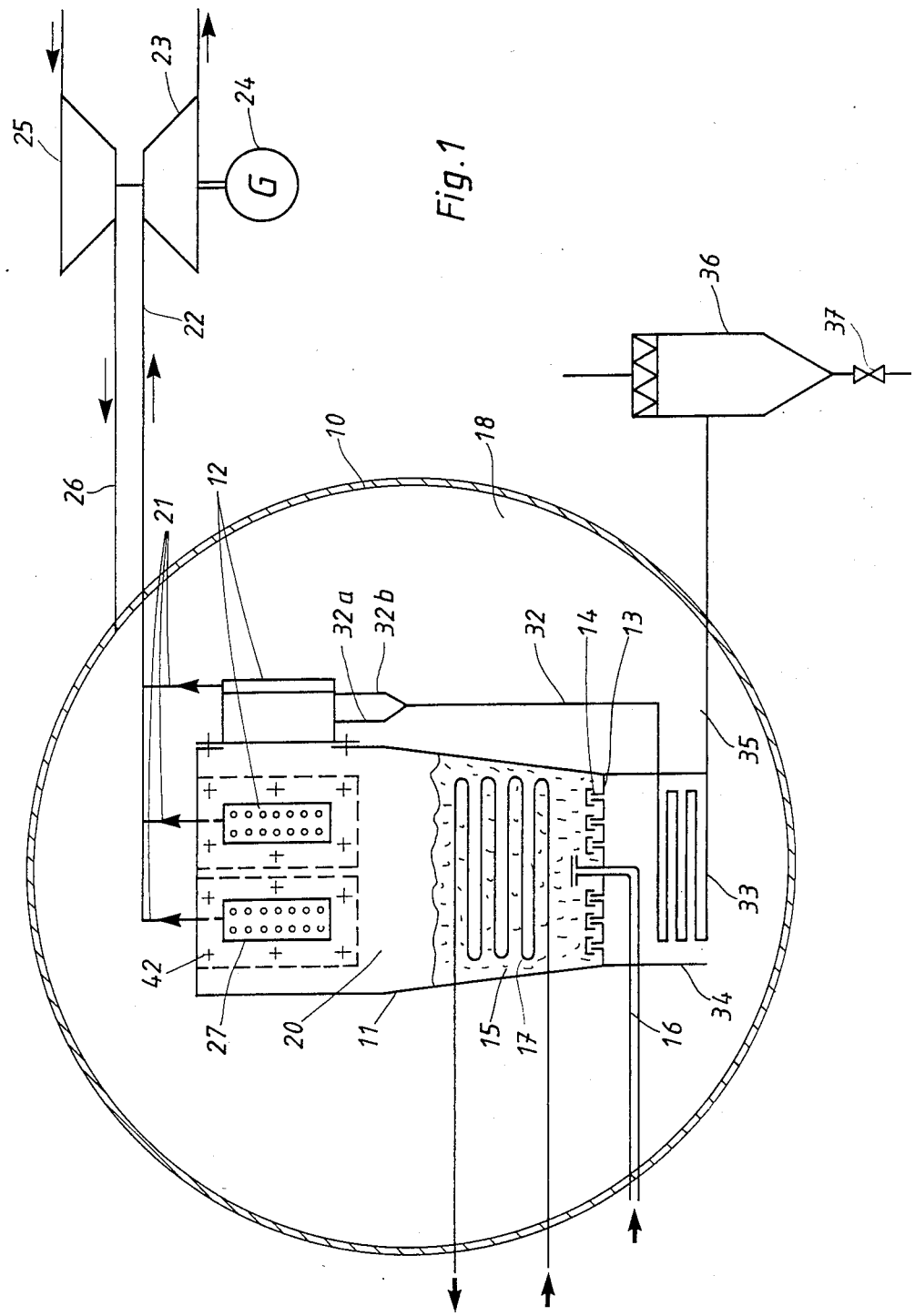

In the figures, 10 designates a pressure vessel surrounding a bed vessel 11 and a number of gas cleaner units 12, connected to the bed vessel 11, for separation of dust in combustion gases leaving the bed vessel 11. The bed vessel 11 is provided with a bottom 13 with air nozzles 14 and supports a bed 15 of fluidizable particulate material, in which a fuel supplied through a fuel pipe 16 from a fuel storage, not shown, is burnt. Tubes 17 are provided in the bed portion of the bed vessel 11, which carry off heat from the bed 15 and heat water or generate steam for operation of a steam turbine (not shown). Air for fluidization of the bed 15 and combustion of supplied fuel is supplied to the bed vessel 11 from the space 18 between the pressure vessel 10 and the bed vessel 11. Combustion gases are collected in the freeboard 20 above the bed 15, pass through the gas cleaners 12 in which accompanying solid particles, consisting of consumed normal bed material and ashes from the fuel, are separated. From the gas cleaners 12 the gas is brought via the conduits 21 to the collecting pipe 22 and through this further to a gas turbine 23. The gas turbine 23 drives a generator 24, which delivers current to a network (not shown), and a compressor 25, which by way of the conduit 26 delivers compressed combustion air to the space 18 inside the pressure vessel 10.

In one or more of the walls of the bed vessel 11 there are openings 27. The gas cleaners 12 are formed as panels or units which are connected to these openings 27 and form part of the bed vessel wall. The gas cleaners 12 can suitably be connected to the bed vessel wall by a bolt joint 42. Material separated in the gas cleaners 12 is carried off via the conduits 32a, 32b, 32, the cooler 33 in the shaft 34 and the conduit 35 to the cyclone 36, in which the solid material is separated from transport gas. This transport gas is cleaned in the filter of cyclone 36. Dust is discharged via the valve 37. The cooler 33 preheats the combustion air, whereby heat in dust and transport gas is utilized.

Figure 2:
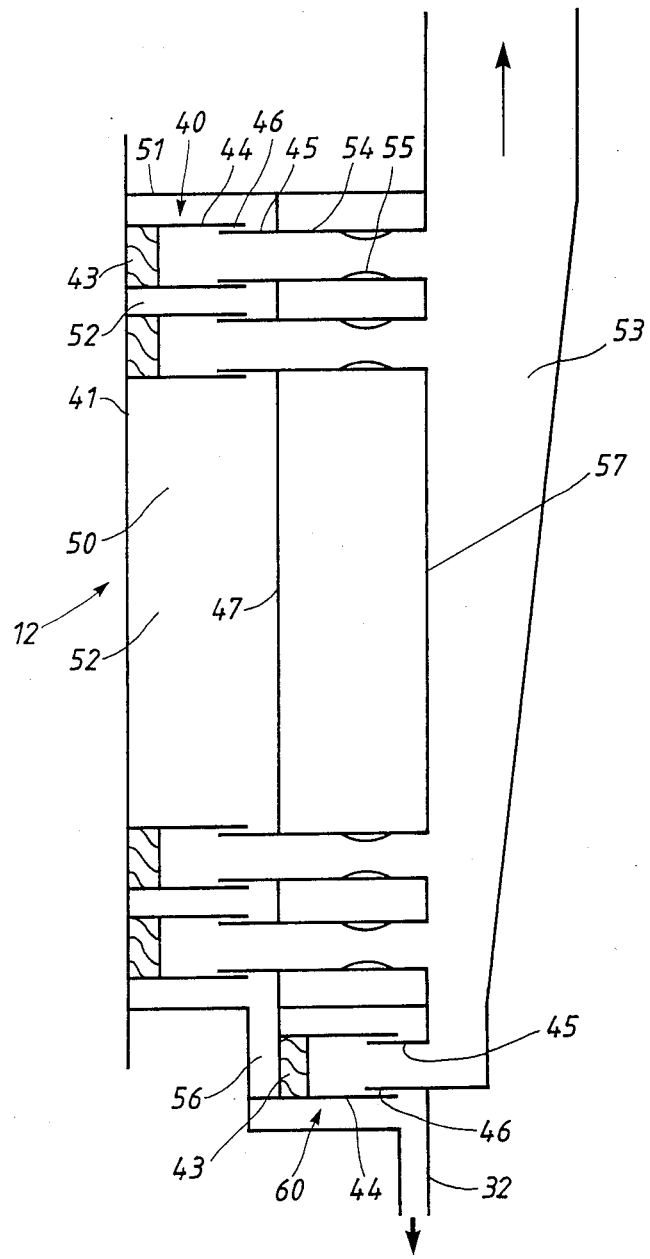
FIG. 2 shows a schematic section of a panel forming part of a wall in a bed vessel and comprising a number of centrifugal type separator units.
Figure 3:
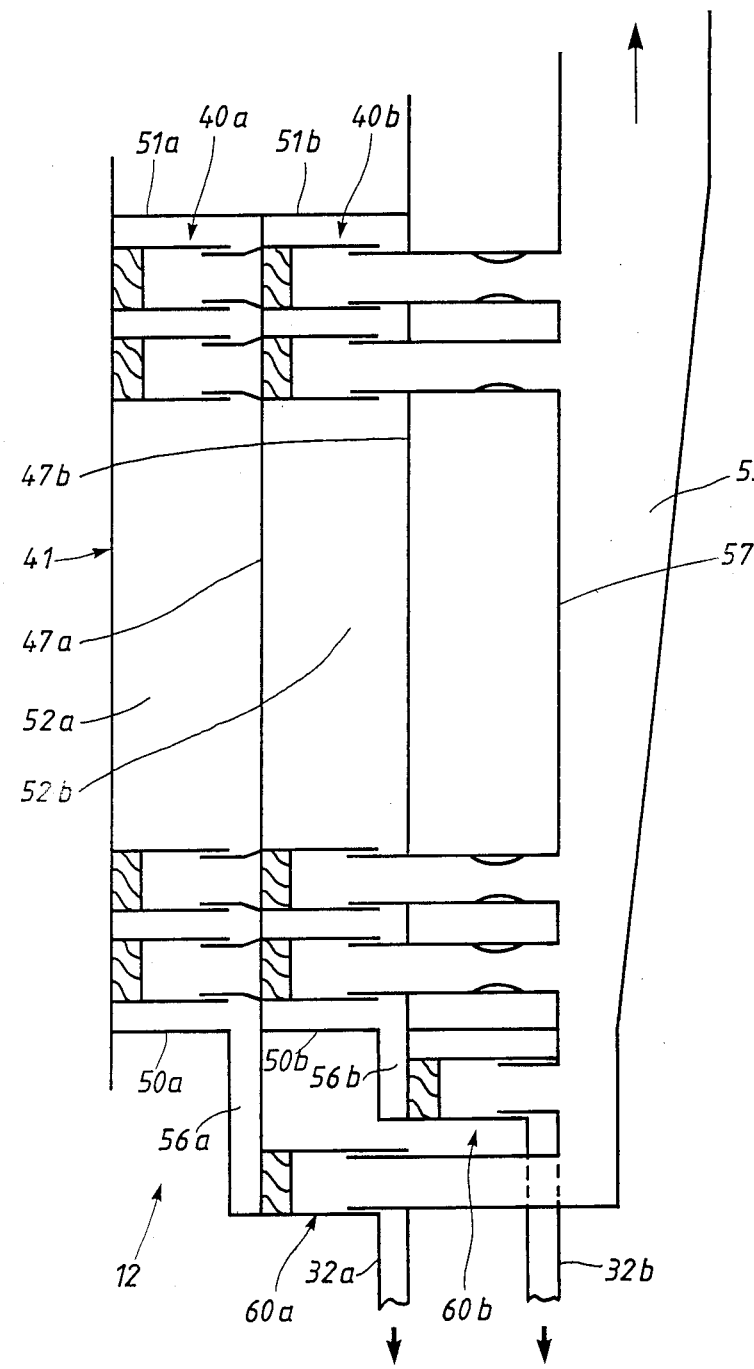
FIG. 3 schematically shows an alternative embodiment of such a panel.

FIGS. 2 and 3 schematically show sections of two different embodiments of a cleaner 12.

In the embodiment according to FIG. 2 the cleaner 12 comprises a number of centrifugal separators 40 arranged in parallel, the upstream side of which are connected to a sheet 41 which is provided with openings adapted to the separators 40. The sheet 41 is larger than the opening 27 and is connected at its periphery to the bed vessel wall, for example with a number of bolts 42 (FIG. 1). The separator comprises a first cylindrical part 44 having guide vanes 43 at its inlet end, and a second cylindrical part 45 sliding into the first part 44 and forming together with that part an annular gap 46. The separators 40 are connected at their ends to the sheet 41 and to a sheet 47 arranged in parallel with sheet 41, and together with side sheets 50, 51 they form a space 52. The gap 46 opens into or communicates with the space 52. The separators 40 are connected to a gas collecting channel 53 by means of tubes 54 with a throttle means 55 which brings about a certain pressure drop.

The tubes 54 are connected to the wall 57 in the channel 53. Gas flowing into a separator 40 is put in rotation by the guide vanes 43, whereby solid particles are collected at the wall in the part 44 and together with part of the gas, for example 10 percent thereof, flow into the gap 46 and further to the space 52. The rest of the gas, thus 90 percent, flows through the tubes 54 to the gas collecting channel 53. The space 52 communicates through the channel 56 with the inlet side of the dust separator 60, in which the loss gas and separated dust from the first cleaning stage are separated. The dust separator 60 may have exactly the same design as the separator 40 and have the same size. The components included have been given the same designations as those in the separator 40. Dust and about 10 percent of the gas are diverted through the gap 46 and carried away through the conduit 32, the cooler 33 and the conduit 35 to the cyclone container 36 (FIG. 1). The main part of the gas quantity, about 90 percent, is conducted through the cylindrical part 45 to the gas collecting channel 53. The gas loss of the order of magnitude of 1 percent.

The throttle means 55 is adapted such that the pressure drop in the tubes 54 is approximately the same as in the dust separator 60 in order to obtain the same flow conditions in the separator 60 as in the separator 40.

In the embodiment according to FIG. 3, two centrifugal separators 40a and 40b are arranged in series and two spaces 52a and 52b are provided for collecting loss gas and dust. These spaces are formed by the walls 41, 47a, 50a, 51a and 47a, 47b, 50b, 51b, respectively. The space 52a communicate with the separator 60a through the channel 56a, and the space 56b communicates with the separator 60b via the channel 56b. Separated dust and part of the gas are carried off through the conduits 32 and 32b, respectively. The other gas is passed to the collecting channel 53 and is passed together with the main stream of cleaned gas to the turbine 23.

Figure 4:
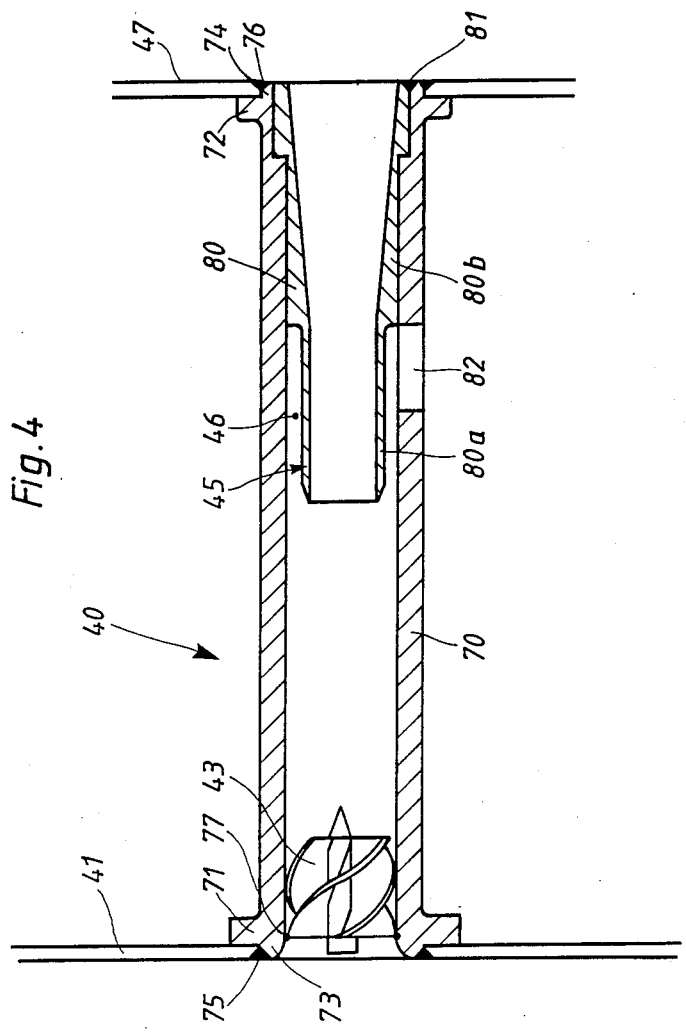
FIG. 4 shows an embodiment of a centrifugal separator in the panel according to FIG. 2.

The centrifugal separators 40 in the cleaner unit 12, made in the form of a panel, may be designed as shown in FIG. 4. The first cylindrical part of the separator may consist of a sleeve 70 with flanges 71, 72 which are each provided with a projecting centering ring 73, 74, by means of which the sleeve 70 is connected to openings in the sheet walls 41 and 47, respectively. The sleeves are fixed to the walls by means of welds 75 and 76, respectively. The second part 45 of the separator consists of a sleeve 80 sliding into the sleeve 70, the inner part 80a of the sleeve 80 together with the sleeve 70 forming the annular gap 46. The outer gap 80b is formed as a guide means centering the sleeve 80 in the sleeve 70. In the wall of the sleeve 70 there is/are one or more openings 82, through which the downstream part of the gap 46 communicates with the surrounding space 52.

In a larger plant there may be provided a considerable number of cleaning units and, in total, thousands of individual centrifugal separators may be included in these cleaner units.

I claim:

1. A power plant with combustion of a fuel in a fluidized bed of particulate material comprising:

a bed vessel;

means for supplying the bed vessel with fuel and combustion air, said air fluidizing the bed material and burning said fuel;

a gas cleaner with a number of first centrifugal separators connected in parallel, each separator having a first cylindrical inlet part with guide vanes for imparting a rotating movement to combustion gas flowing therethrough, and a second cylindrical part projecting into the downstream end of the inlet part and together with that part forming an annular gap;

a space, common to several centrifugal separators, defined downstream of said gap for collecting gas and dust from said gap;

at least one second stage centrifugal separator connected in series with said first centrifugal separators for cleaning the gas collected in said gas collecting space; and a common outlet channel collecting cleaned gas from said first and second centrifugal separators.

2. A power plant according to claim 1, wherein said gas cleaner forms a part of a wall in the bed vessel.

3. A power plant according to claim 1, wherein said gas cleaner is a panel or unit attached to a wall in the bed vessel.

4. A power plant according to claim 2, wherein a plurality of panels or units form parts in at least one of the bed vessel walls.

5. A power plant according to claim 1, wherein there is a throttle means between the first centrifugal separators and the outlet channel for bringing about a pressure drop corresponding to the pressure drop in the centrifugal separator of the second stage.

6. A power plant according to any of the preceding claims, wherein the power plant further delivers pressurized combustion generating propellent gas for a gas turbine.

* * * * *